United States Patent [19]
Zablonier et al.

[11] Patent Number: 6,042,090
[45] Date of Patent: Mar. 28, 2000

[54] DISTRIBUTOR DEVICE FOR A COLUMN

[75] Inventors: Nikolaus Zablonier; Felix Moser, both of Winterthur, Switzerland

[73] Assignee: Sulzer Chemtech AG, Winterthur, Switzerland

[21] Appl. No.: 09/074,524

[22] Filed: May 7, 1998

[30] Foreign Application Priority Data

May 16, 1997 [EP] European Pat. Off. .............. 97810307

[51] Int. Cl.[7] .................................................. B01F 3/04
[52] U.S. Cl. ................................ 261/97; 261/111; 95/149; 202/158
[58] Field of Search ................................ 261/96, 97, 111, 261/115, 116; 95/149, 211; 202/158

[56] References Cited

U.S. PATENT DOCUMENTS

| | | | |
|---|---|---|---|
| 3,419,251 | 12/1968 | Eckert | 261/97 |
| 4,320,072 | 3/1982 | Arndt | 261/111 |
| 4,776,989 | 10/1988 | Harper et al. | 261/97 |
| 5,601,688 | 2/1997 | Assaf et al. | 261/116 |
| 5,605,655 | 2/1997 | Ishihara et al. | 261/116 |
| 5,616,290 | 4/1997 | Ishihara et al. | 261/115 |
| 5,679,290 | 10/1997 | Cameron et al. | 261/96 |

FOREIGN PATENT DOCUMENTS

| | | |
|---|---|---|
| 0142603A1 | 5/1985 | European Pat. Off. . |
| 0676230A2 | 10/1995 | European Pat. Off. . |
| 1542528 | 3/1970 | Germany . |
| 2051606 | 1/1981 | United Kingdom ..... 261/97 |

OTHER PUBLICATIONS

Melltech Column Internals—The Concept of Packed Columns Sulzer Chemtech, Oct. 1992.

Primary Examiner—C. Scott Bushey
Attorney, Agent, or Firm—Townsend and Townsend and Crew LLP

[57] ABSTRACT

The distributor device for a column includes a system of distributor tubes and nozzles for a fluid. The outlet apertures of the nozzles are preferably all arranged at the same height. At least a portion of the nozzles are manufactured of similar glass tube pieces. Each outlet aperture has a border which is formed by an edge produced by a milling cut and is otherwise untreated or by an untreated, broken glass edge.

10 Claims, 2 Drawing Sheets

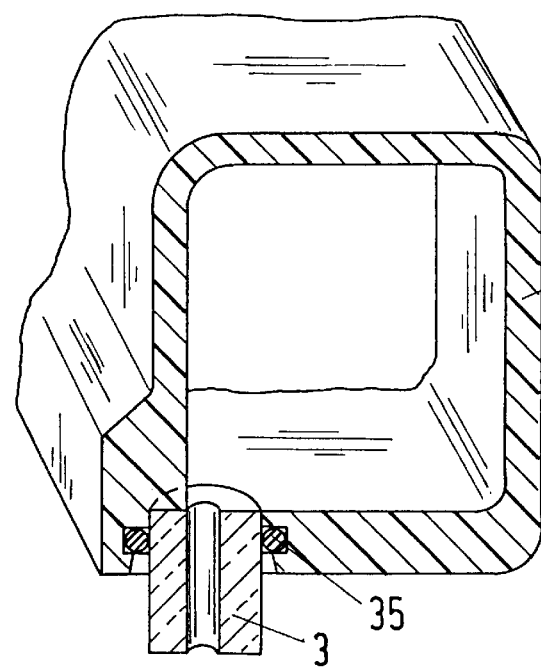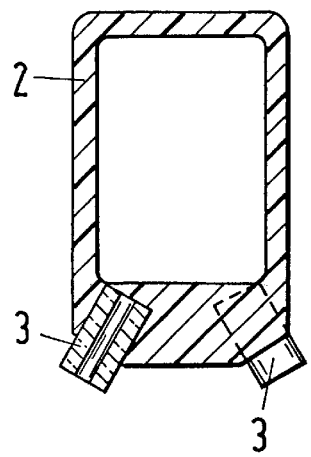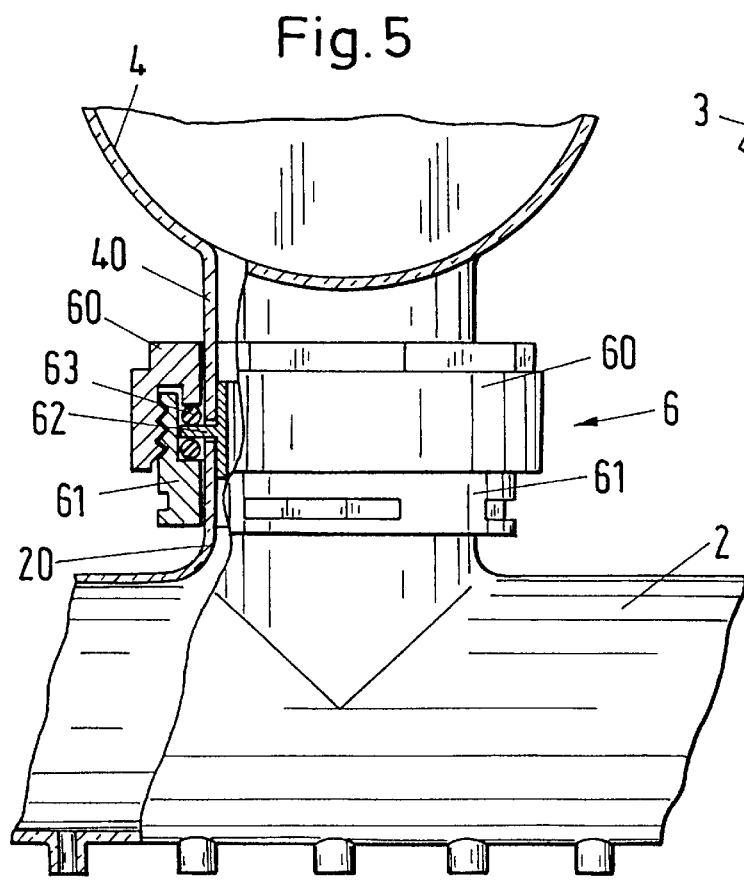

DISTRIBUTOR DEVICE FOR A COLUMN

BACKGROUND OF THE INVENTION

1. Field of the Invention

The invention relates to a distributor device for a column including a system of distributor tubes and nozzles for a fluid and it further relates to the use of the column and/or the distributor device.

2. Description of the Prior Art

As regards form and material, a large number of distributor devices are known by means of which liquids can be uniformly applied to the packings of columns. For the distribution of corrosive liquids, glass inlet inserts for the point-wise application of liquid and ring showers are known commercially. The ring shower consists of a ring-shaped glass tube which has a base hole out-flow system. Differences with respect to the geometry of their outlet apertures exist as a rule between the individual base holes of the out-flow system, as a result of which different out-flow rates result and thus a uniform distribution cannot be achieved in practice. In addition, ring showers are suitable only for columns with relatively small diameters, and a uniform distribution of the outlet apertures over the entire cross-section is not possible.

SUMMARY OF THE INVENTION

The object of the invention is to provide an inert distributor device which is suitable for liquids which act corrosively on metals and which enables the same outflow rates of all the distribution nozzles or of some of the nozzles. Furthermore, it will be possible to construct distributor devices for columns with arbitrarily large diameters.

The distributor device in accordance with the invention for a column comprises a system of distributor tubes and nozzles for a fluid. The outlet apertures of the nozzles are preferably all arranged at the same level. The nozzles are at least partially manufactured of similar glass tube pieces. Each outlet aperture has a border which is formed by an edge which is produced by means of a milling cut and is otherwise untreated or by an untreated, broken glass edge. A milling blade provided with diamond grains, which is conventionally used in glass working, can be used for the formation of the milling cut.

If each nozzle is to contribute to the distribution of the liquid to the same extent, then all nozzles must be manufactured of similar glass tube pieces and the outlet apertures must be arranged at the same level. In special cases, however, it can be advantageous to provide different outflow rates for individual nozzles, for example, for those at the boundaries. This can also be achieved by different nozzle diameters and/or by arrangement of the outlet apertures at a different level.

The distributor device in accordance with the invention satisfies quality requirements which had previously been achievable with metallic distributors. These requirements relate to the following items: dimensional precision, in particular, horizontality (±0.1%); distribution density (about 60 to 300 outflow apertures or drip points per $m^2$); equidistant distribution of the outflow apertures; outflow rates of all outflow apertures practically of the same value so that even the most difficult distillation applications are possible.

Using the device in accordance with the invention, a first liquid can be introduced into a column filled with a second liquid—in particular, for carrying out a sorption process. Instead of a liquid, a gas can also be introduced into a column which is filled with a liquid.

BRIEF DESCRIPTION OF THE DRAWINGS

FIG. 3 is a section of a distributor tube which consists of plastic, FIG. 4 is a cross-section through a further distributor tube and FIG. 5 is a connection point of a multiple part device in accordance with the invention.

DETAILED DESCRIPTION OF THE PREFERRED EXEMPLARY EMBODIMENTS

Figure 1:
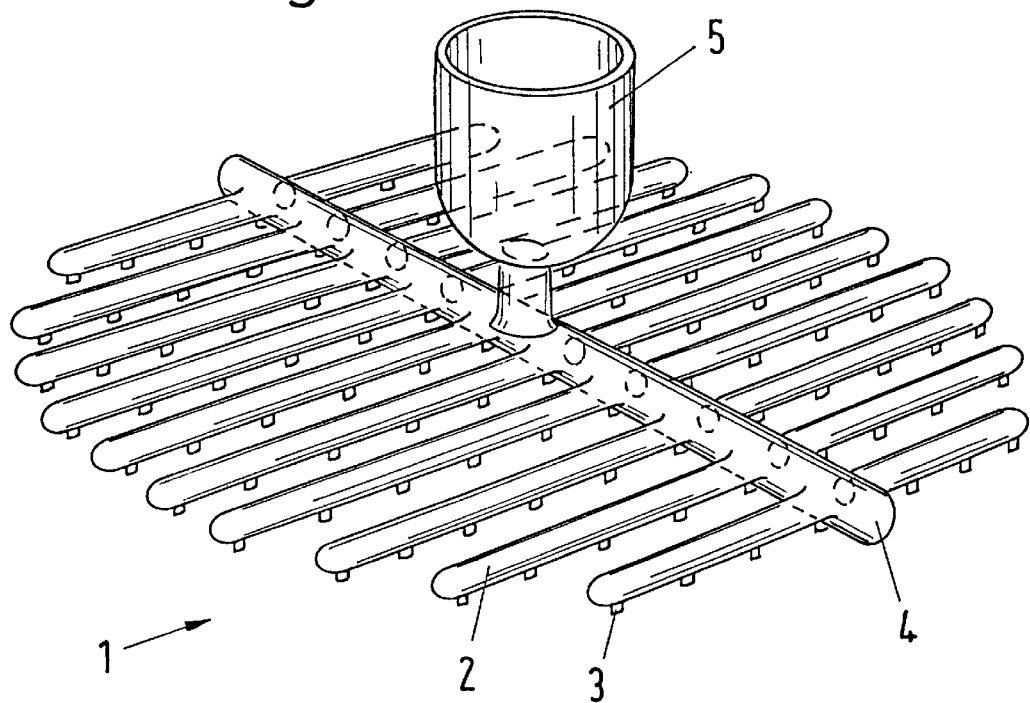
FIG. 1 is a distributor device in accordance with the invention which forms a unit made of glass.

The distributor device 1 shown in FIG. 1 consists of glass and has the following construction: a plurality of distributor tubes 2 with nozzles 3 which, in accordance with the invention, are manufactured of glass tube pieces; an inlet tube 4 placed ahead of the tubes 2; and a bell or funnel 5 to which the liquid to be distributed can be supplied and in which the liquid collects up to a level depending on the outflow rate. The nozzles are all arranged at the same height so that the same outlet conditions result in each case.

Figure 2:
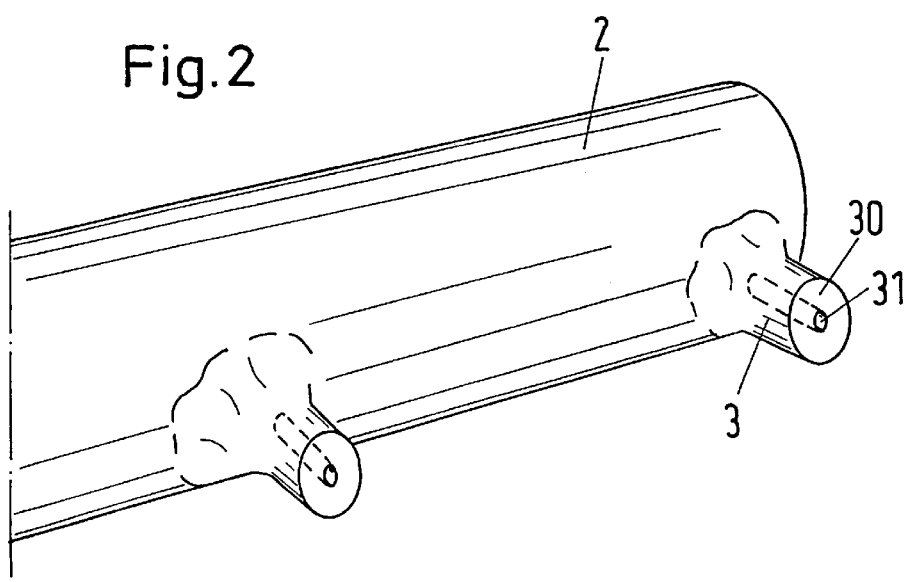
FIG. 2 illustrates two nozzles of the device.

FIG. 2 shows a distributor tube 2 which is lying on its side and to which two glass tube pieces 3 serving as nozzles are attached by melting of the glass. The end face 30 of the tube piece 3 containing the outlet aperture 31 is an untreated mill-cut or broken glass surface. Thanks to this feature, the borders of the outlet apertures 31 are formed by edges produced by means of mill-cutting or glass breakage and are otherwise untreated. Practically the same outlet conditions for the liquid to be distributed are present at all nozzles 3. Thus, a uniform distribution of the liquid is ensured without a special effort. Commercially available capillary tubes which have a precisely formed inner diameter are advantageously used for the manufacture of the glass tube pieces 3. The glass tube pieces 3 have all been milled to the same length after having been fused in place.

The glass tube pieces 3 can also be arranged in the distributor tube 2 in such a manner that their entry points (likewise with breakage surfaces or milled cut surfaces) come to lie in the middle region of the tube 2. In this arrangement, contaminant particles can deposit at a level below that of the entry points. Nozzle passages, which are sensitive to contamination, are thereby less often disturbed by contaminant particles; and the occurrence of hindrances to the through-flow is thus reduced.

Not shown in FIG. 1 are rests, the purpose of which is to be able to set the device on a support in the column. Rests of this kind advantageously consist of tubular or bell-shaped parts which are melted onto the lower side of the distributor tubes 2.

The distributor tubes 2 can also be manufactured of extruded plastic tubes. FIG. 3 shows an exemplary embodiment: The glass tube pieces 3 are inserted into apertures formed for that purpose and fastened with a sealing ring 35. Further possible materials in lieu of plastic are ceramic materials.

As shown in FIG. 4, more than one row of nozzles 3 can also be provided per distributor tube 2. In the exemplary embodiment illustrated, the nozzles 3 are arranged to be displaced; and they are inclined instead of being oriented vertically.

The distributor device in accordance with the invention can also be formed as a plurality of parts, with the parts being releasably connected to one another. FIG. 5 shows a connection 6 of this kind between a distributor tube 2 with nozzles 3 and an inflow tube 4. A connection piece 20 of the tube 2 is connected to a connection piece 40 of the other tube 4. The connection 6 is assembled from the following components: an upper part 60 and a lower part 61 which are screwed together via threaded portions; an intermediate piece 62; and two sealing rings 63, by means of which the two connection pieces 20 and 40 are sealed against the outside on the one hand and, on the other hand, a tight connection is produced together with the intermediate piece 62. For columns with large diameters, the distributors must be constructed in the form of assembled devices.

Values in the range between 0.3 mm and 10 mm are provided for the diameter of the nozzle outlet areas 31. The free length of the glass tube pieces 3 advantageously amounts to about 10 to 15 mm.

The distributor device in accordance with the invention is particularly advantageous for columns with an ordered, structured, packing. In columns of this kind, the nozzles are arranged in such a manner that partial regions of equal size or of largely equal size can be associated with thee packing with respect to fluid distribution. Deviations from a uniform distribution generally result in the marginal region.

The distributor device in accordance with the invention consists entirely of glass or of glass and, for example, plastic; it contains no metallic parts. Columns with distributor devices of this kind are particularly well suited for performing a material transfer or exchange between a gas and a liquid, with one or both of these phases containing a substance which acts corrosively on metal. Obviously the remaining installations in a column of this kind must also consist of materials which are inert with respect to the substances to be treated.

What is claimed is:

1. A column comprising:
   a distributor device comprising:
      a system of distributor tubes and nozzles for a fluid, each nozzle including an outlet aperture and the outlet apertures of the nozzles being arranged at the same height wherein at least some of the nozzles are manufactured of similar glass tube pieces;
      wherein each outlet aperture has a border which is formed by an edge wherein each edge is produced by one of an untreated, broken glass edge or a milling cut; and
      wherein each edge is further untreated;
   an ordered, structured packing;
   wherein the packing and the nozzles are arranged such that equally large partial regions with respect to fluid distribution and a majority of the nozzles may be associated with the packing.

2. A method for performing an exchange of substances between a gas and a liquid, the method comprising:
   providing a column comprising:
      a distributor device comprising:
         a system of distributor tubes and nozzles for a fluid, each nozzle including an outlet aperture and the outlet apertures of the nozzles being arranged at the same height wherein at least some of the nozzles are manufactured of similar glass tube pieces;
         wherein each outlet aperture has a border which is formed by an edge wherein each edge is produced by one of an untreated, broken glass edge or a milling cut; and
         wherein each edge is further untreated; and
      an ordered, structured packing; wherein the packing and the nozzles are arranged such that equally large partial regions with respect to fluid distribution and a majority of the nozzles may be associated with the packing;
   supplying a gas and a liquid to the packing by means of the distributor device; and
   acting the liquid corrosively on metals; wherein the packing consists of a material that is inert with respect to the liquid.

3. A method for carrying out a sorption process, the method comprising:
   providing a distributor device for a column, comprising:
      a system of distributor tubes and nozzles for a fluid, each nozzle including an outlet aperture and the outlet apertures of the nozzles being arranged at the same height wherein at least some of the nozzles are manufactured of similar glass tube pieces;
      wherein each outlet aperture has a border which is formed by an edge wherein each edge is produced by one of an untreated, broken glass edge or a milling cut; and
      wherein each edge is further untreated; and
   introducing a first liquid or a gas by means of the distributor device into a column filled with a second liquid.

4. A distributor device for a column, comprising
   a system of distributor tubes and nozzles for a fluid, each nozzle including
      an outlet aperture and the outlet apertures of the nozzles being arranged at the same height wherein at least some of the nozzles are manufactured of similar glass tube pieces; wherein each outlet aperture has a border which is formed by an edge wherein each edge is produced by one of an untreated, broken glass edge or a milling cut; and wherein each edge is further untreated.

5. A distributor device in accordance with claim 4 wherein glass tube pieces are attached to at least one glass distributor tube by fusion; and wherein the glass tube pieces have been milled to the same length after being attached.

6. A distributor device in accordance with claim 5 wherein an inlet tube and the system of distributor tubes form a unit manufactured of glass.

7. A distributor device in accordance with claim 5 wherein the distributor device is formed of a plurality of parts; and wherein the parts can be releasably connected on one another.

8. A distributor device in accordance with claim 4 wherein the diameter of the nozzles is in a range of about 0.3 mm and 10 mm.

9. A distributor device in accordance with claim 4 wherein the glass tube pieces are approximately 10 to 15 mm long in a free standing region.

10. A distributor device in accordance with claim 4 wherein the glass tube pieces are arranged in the distributor tube in such a manner that their entry points come to lie in the middle region of the tube.

* * * * *